July 7, 1964 C. E. NUTTING 3,140,329
ATTACHMENT MEANS
Filed May 22, 1962

INVENTOR.
CHARLES E. NUTTING
BY
*Ezekiel Wolf, Wolf & Greenfield*
ATTORNEYS

United States Patent Office 3,140,329
Patented July 7, 1964

3,140,329
ATTACHMENT MEANS
Charles E. Nutting, Newtonville, Mass., assignor to Beacon Plastics Corporation, Newton Highlands, Mass., a corporation of Massachusetts
Filed May 22, 1962, Ser. No. 196,750
1 Claim. (Cl. 264—242)

The present invention relates to a novel and improved method for molding plastic articles with attached members and to the articles produced by the method.

It is frequently desirable to integrally secure members to molded articles. This is particularly true in the blow molding art when hollow articles are formed. For example, when beverage pitchers are blow molded, a handle is usually provided on the pitcher. The handle may be formed integrally with the pitcher during the blow molding procedure in which case they often comprise hollow portions, connecting with a main hollow body portion of the pitcher.

Alternatively, handles may be attached to blow molded pitchers by a second operation after completion of molding. The integral handles are disadvantageous in that in use, beverages in the body of a blow molded pitcher flow into the hollow portion of the handle and leave a residue when the pitcher is emptied making the handle extremely difficult to clean. Separately attached handles require a manufacturing operation after molding and add to the problems and expense of producing molded pitchers.

The method of the present invention may be carried out employing conventional molding techniques and is particularly useful in blow molding. It is also an object of the invention to provide a method of molding interlocked members without significantly adding to the molding or assembly cost of articles produced.

A further object of the invention is to provide a member fixed with respect to or alternatively, to provide a member in pivotal relation to a blow molded article.

It is a further object of this invention to provide a blow molded article having a handle or member attached in an improved fashion such that the construction is simple and easy to clean.

In the method of the present invention a member is positioned adjacent a molding cavity with a portion of the member having an undercut area thereon lying within the molding cavity. A hot plastic is introduced into the molding cavity and is conformed to the shape of the molding cavity by blow molding techniques. This hot plastic surrounds and interlocks the projecting undercut area of the member which is being attached. In a preferred form, the method includes positioning a member to be attached adjacent a molding cavity with a portion of the member having an undercut area, preferably at its ends, projecting into the molding cavity, introducing a hot plastic parison into the molding cavity and expanding the hot plastic parison to cause the plastic to conform to the shape of the molding cavity and to cover and interlock with the undercut area projecting into the molding cavity.

The article of the present invention generally comprises a hollow, blow molded plastic article having a member attached to the article by an interlocking undercut area of the attachment member in a manner which preferably prevents passage of fluids from the hollow article to the attachment member.

Numerous other features, objects and advantages of the present invention will become apparent from the following specification when read in connection with the accompanying drawing, in which.

Figure 4:
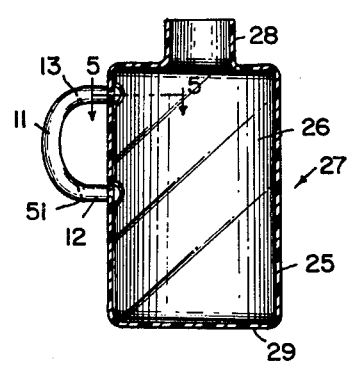
FIG. 4 is a cross sectional view of a preferred embodiment of a hollow plastic article of this invention.

In a preferred embodiment of the article of the present invention as shown in FIG. 4 a pitcher is designated generally at 27. The pitcher has a tubular upstanding wall 25, integral base 29, and an integral upper neck portion 28. The wall 25 is adjacent and surrounds a hollow body portion 26 of the pitcher. The pitcher is composed of a thermoplastic blow molded material such as polyeythylene. Alternatively other well known thermoplastic materials may be employed.

A member 11 forms a handle for the pitcher and is affixed to wall 25. Preferably the handle is a plastic handle composed of similar thermoplastic materials as employed for the other elements of the pitcher. Plastics such as polypropylene, nylon, polyethylene, vinyl plastics, etc., are typical of plastic materials useful in this invention. The handle 11 is preferably blow molded and has a generally C shape and a circular cross section. Projecting portions 12 and 13 are provided on the handle. The end of portions 12 and 13 are each provided with a circular boss 17 forming a circular undercut area 15. The circular boss 17 has an outer convex surface 33 forming a male socket integral with the undercut area 15. A corresponding female socket is provided in the wall 25 extending inwardly towards the hollow portion 26. A ridge 16 surrounds an opening of the female socket and in conjunction with the socket forms an undercut recess 34 for receiving male socket 33 and the undercut area 15 therein.

Figure 5:
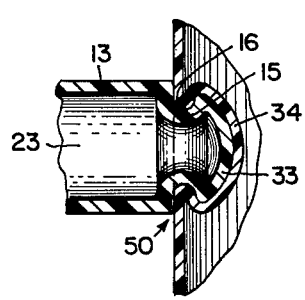
FIG. 5 is a fragmentary cross sectional view taken through lines 5—5 of FIG. 4; and, FIG. 6 is a fragmentary cross sectional view taken through the center of an alternate embodiment of this invention.

As most clearly seen in FIG. 5, a strong durable joint is formed between wall 25 and the attachment member or handle 11. The joint prevents passage of fluid between a hollow portion 23 of handle 11 and the hollow body portion 26 as there is no perforation in the wall 25.

The use of a blow molded handle is an important feature of this invention. Such handles are easily formed to the desired shape, are relatively inexpensive to construct, and reduce the shipping weight of completed articles. However, it is also possible to employ solid plastic handles molded in conventional manner and in some cases to employ materials such as wood or metal.

Many modifications of the attachment member or handle may be employed in this invention. For example, three or more projecting portions may be employed. The undercut area may have a circular configuration as shown or, alternatively other types of undercut areas may be employed such as ridges, depressions, slots etc. In all cases, the undercut recess of the wall 25 will conform closely and lie adjacent to the undercut area of the projection portions.

Still another possible modification of the present invention comprises the use of a plurality of undercut areas on each of the projecting portions. Specifically, a series of grooves may be formed on the circular portions 12 and 13 and the undercut recess will be formed to engage and closely surround the grooves.

While the preferred embodiment of the member of this invention is particularly designed for stationary attachment to a blow molded hollow article, in some embodiments, pivotable attachment members may be provided. In such embodiments, a single projecting portion may be employed. For example, as shown in FIG. 4, the projecting portion 12 may be eliminated at the dotted line 51. In this case the attachment member 11 is free to pivot around an axis through the center of a circle formed by ridge 16. When the attachment member is to be pivotable, it is preferred to employ a thin layer of lubricant such as silicon grease lining the undercut recess 34 and lying between the recess 34 and the boss 17. In a specific embodiment, the pivotable attachment member may comprise a simulated lever and be pivotably attached to a hollow plastic toy locomotive.

Figure 6:
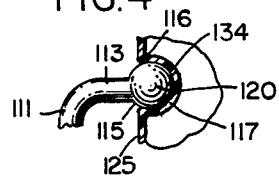

In another embodiment of this invention, illustrated at FIG. 6, an undercut recess 134 is provided forming a female socket in a wall 125 of a plastic blow molded article. A member 111 is attached to wall 125 by a spherical end 117 of projecting member 113. The spherical end 117 has a center point located within the undercut recess defined by a circular ridge 116 of wall 125. Thus, the ridge 116 surrounds and covers a portion of spherical end 117 which comprises an undercut area 115. When a single projecting member 113 is employed, it is free to pivot around recess 134 or to move or rotate within limits defined by a fixed point 120 at the center of spherical end 117 and the edge of the ridge 116.

In some embodiments plural projection portions 113 may be employed on member 111 and attached to wall 25 as above described. When two projection portions 113 are employed, the member 111 is pivotable on a line drawn between points 120 thereof. When more than two projecting portions 113 are employed the member 111 is stationary.

In its preferred form, the method of this invention is carried out employing conventional blow molding techniques as described in U.S. Patents Nos. 2,597,558 and 2,349,176.

The attachment member 11 is first preferably positioned on the parting line of two conventional blow molding die cavity blocks. Recesses are provided in each of the mold cavity blocks corresponding to one-half the cross section of the projecting portions 12 and 13. The undercut areas 15 of the handle are located so as to project into a molding cavity formed by the mold cavity blocks. Alternatively the handle may be inserted into the mold cavity by any conventional means such as recesses provided in the mold cavity blocks at points other than on the parting line of the cavity blocks.

Figure 1:
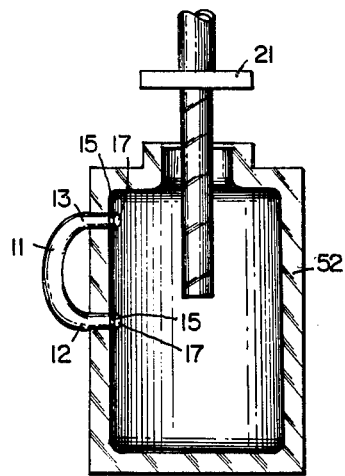
FIG. 1 is a semi-diagrammatic view of a first step in the preferred embodiment of the method of this invention.

FIG. 1 diagrammatically shows a handle 11 positioned within a recess of a molding cavity block 52. Undercut areas 15 extend into the area of the molding cavity. A mating recess is provided on a second molding cavity block (not shown), which is spaced from the molding cavity block 52, shown in FIG. 1. A hot plastic parison 30 of polyethylene or other suitable plastic material is extruded by an extruder 21 into the area between the open mold cavity blocks.

Figure 2:
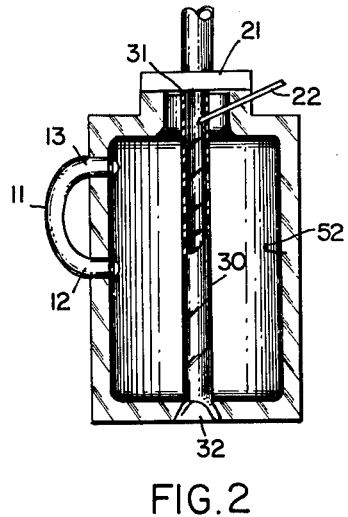
FIG. 2 shows a second step thereof.

As shown semi-diagrammatically and sequentially in FIG. 2, the molding cavity blocks are then closed to form a molding cavity. The closing of the mold cavity blocks, clamps or pinches the ends 31 and 32 of the parison 30. A fluid injection tube 21 pierces the parison 30 and injects fluid such as air into the tube.

Figure 3:
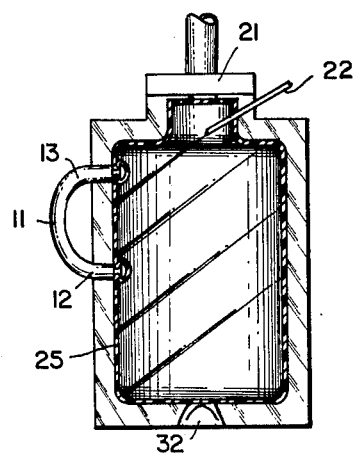
FIG. 3 shows a third step thereof.

As shown in FIG. 3, the parison is expanded by the injected air and shaped by the air to conform to the inner surface of the molding cavity and to cover and interlock with the undercut areas of the handle 11. At this point, the parison 30 is cured or hardened and forms a pitcher, as shown in FIG. 4, with the pinched ends and neck plug removed. Plastic material completely surrounds and interlocks the bosses 17 forming a joint between the bosses 17 and the undercut recesses 34.

The joint formed is durable, simple and relatively inexpensive to produce. Normally when conventional molding times, temperatures and pressures are employed, there is no fusing of the boss 17 with the undercut recess 34. Nonetheless, a tight fit of the boss in the recess is accomplished. If it is desired to fuse the boss 17 to the recess 34, the handle 11 may be preheated before molding or, alternatively, higher temperatures may be employed in the molding procedure.

When a member is to be employed carrying a single projecting portion, the method described above may be followed.

This invention also contemplates a method of introducing a member and body in pivoting relationship. In this arrangement the method described above may be followed. However, a lubricant may be added to permit free pivotable action. Preferably the bosses and undercut areas 17 and 15 respectively are covered with a thin layer of silicon grease or other lubricant previous to positioning the member 11 in the mold cavity in the step shown in FIG. 1. In this case, the joint formed is fully lubricated. In other applications, it is possible to wet the boss 17 and undercut area 15 with a heat vaporizable solid or liquid such as water, which causes the undercut recess 34 to be spaced slightly from the surface of the boss 17 and undercut area 15 when the parison is formed and blow molded into engagement therewith. After the molding procedure, the water may be evaporated and a free space provided between the recess 34 and the male socket 33. This free space is useful in allowing the rotation or pivoting of the member 11. When a free space is provided, conventional lubricants may later be applied thereto to enhance the pivoting action of the attachment member.

The method of this invention as above desccribed may be employed to interlock blow molded articles with members of the type illustrated in FIG. 6. In this case a portion of undercut area 115 is positioned in a recess provided in the molding cavity blocks and a second portion of undercut area 115 extends into the molding cavity.

It should be understood that while there have been disclosed specific plastic articles useful in this invention, many variations are possible. For example, the hollow blow molded article may have varying shapes and configurations. Similarly, the members employed may vary in shape and dimension. Therefore, while there have been described what are at present considered to be preferred embodiments of this invention, it will be obvious to those skilled in the art that various changes and modifications may be made therein without departing from the spirit and scope of the invention and it is therefore aimed in the appended claim to cover all such changes and modifications as are within the true scope of this invention.

What is claimed is:

A method of permanently joining an attachment member to an organic plastic article, said method comprising, positioning an attachment member adjacent a molding cavity with a portion of the member having a spherical outer configuration and an undercut area lying within the molding cavity, introducing a hot plastic parison into the molding cavity and forming said parison so as to provide a hollow plastic article having an outer wall portion with an integral inwardly extending portion of the wall extending into a hollow space defined by said article and forming a female socket for said undercut area, said inwardly extending portion having a smaller perimeter at a cross section thereof closer to said outer wall portion than at a perimeter more remote from said outer wall portion, said attachment member portion having been coated with a means for preventing adherence between said wall and said portion whereby said member is pivotable in said female socket after molding.

References Cited in the file of this patent

UNITED STATES PATENTS

| | | | |
|---|---|---|---|
| Re. 3,116 | Atterbury | Sept. 15, | 1868 |
| 182,242 | Stoehr | Sept. 12, | 1876 |
| 191,534 | Knecht | June 5, | 1877 |
| 311,092 | West | Jan. 20, | 1885 |
| 507,849 | Seamon et al. | Oct. 31, | 1893 |
| 1,881,601 | Hufferd et al. | Oct. 11, | 1932 |
| 2,127,043 | Most | Aug. 16, | 1938 |
| 2,525,465 | Swarovski | Oct. 10, | 1950 |
| 2,632,202 | Haines | Mar. 24, | 1953 |
| 3,015,856 | Cohn | Jan. 9, | 1962 |